(12) United States Patent
Axmon et al.

(10) Patent No.: US 10,327,249 B2
(45) Date of Patent: Jun. 18, 2019

(54) UPLINK RESOURCE ALLOCATION IN A UNIDIRECTIONAL SINGLE FREQUENCY NETWORK ARRANGEMENT FOR HIGH SPEED TRAINS

(71) Applicant: Telefonaktiebolaget LM Ericsson (publ), Stockholm (SE)

(72) Inventors: Joakim Axmon, Kavlinge (SE); Magnus Larsson, Sollentuna (SE); Torgny Palenius, Barseback (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 211 days.

(21) Appl. No.: 15/312,680

(22) PCT Filed: Feb. 11, 2016

(86) PCT No.: PCT/EP2016/052912
§ 371 (c)(1),
(2) Date: Nov. 21, 2016

(87) PCT Pub. No.: WO2017/080680
PCT Pub. Date: May 18, 2017

(65) Prior Publication Data
US 2017/0289991 A1    Oct. 5, 2017

Related U.S. Application Data

(60) Provisional application No. 62/252,627, filed on Nov. 9, 2015.

(51) Int. Cl.
*H04W 72/04* (2009.01)
*H04W 76/10* (2018.01)
(Continued)

(52) U.S. Cl.
CPC ....... *H04W 72/048* (2013.01); *H04W 72/042* (2013.01); *H04W 72/0413* (2013.01);
(Continued)

(58) Field of Classification Search
CPC ........... H04W 72/0413; H04W 72/042; H04W 72/048; H04W 72/082; H04W 76/10; H04W 28/16
See application file for complete search history.

(56) References Cited

U.S. PATENT DOCUMENTS 5,930,721 A      7/1999  Fried et al.
9,325,389 B2 *   4/2016  Yu .............................. H04L 1/06
(Continued)

FOREIGN PATENT DOCUMENTS

WO       2012130270 A1     10/2012

OTHER PUBLICATIONS

PCT International Search Report, dated Jan. 3, 2017, in connection with International Application No. PCT/EP2016/074459, all pages.
(Continued)

*Primary Examiner* — Paul H Masur
(74) *Attorney, Agent, or Firm* — Leffler Intellectual Property Law, PLLC

(57) ABSTRACT

A network node is connected to a plurality of antenna nodes that are located along a constrained path where a plurality of wireless communication devices are located. The antenna nodes are controlled to maintain reception radio lobes substantially along the path such that the wireless communication devices can perform uplink radio communication with the network node via the reception radio lobes. At least one radio frequency, RF, signal is detected and a determination is made that the detected at least one RF signal originates from a respective wireless communication device of a specific subset among said plurality of wireless communi-
(Continued)

cation devices. The specific subset comprises wireless communication devices that are associated with a common radio frequency offset. An allocation of a common uplink radio communication resource is then made for all wireless communication devices in the specific subset of wireless communication devices.

29 Claims, 6 Drawing Sheets

(51) Int. Cl.
   *H04W 28/16* (2009.01)
   *H04W 72/08* (2009.01)
(52) U.S. Cl.
   CPC ............ *H04W 76/10* (2018.02); *H04W 28/16* (2013.01); *H04W 72/082* (2013.01)

(56) References Cited

U.S. PATENT DOCUMENTS

| | | | |
|---|---|---|---|
| 2009/0247169 | A1 | 10/2009 | Kawasaki |
| 2009/0316653 | A1 | 12/2009 | Meyer et al. |
| 2010/0054235 | A1 | 3/2010 | Kwon et al. |
| 2010/0273504 | A1 | 10/2010 | Bull et al. |
| 2012/0004009 | A1 | 1/2012 | Lindoff et al. |
| 2014/0016534 | A1 | 1/2014 | Kim et al. |
| 2014/0225775 | A1* | 8/2014 | Clevorn .................. H01Q 3/34 342/372 |
| 2015/0016290 | A1 | 1/2015 | Griesing et al. |
| 2015/0065145 | A1 | 3/2015 | Huang |
| 2015/0141021 | A1* | 5/2015 | Kapoulas ............. H04W 36/32 455/441 |
| 2015/0156760 | A1 | 6/2015 | Yu et al. |
| 2016/0325766 | A1* | 11/2016 | Tsujita ................... B61L 3/125 |
| 2016/0345221 | A1* | 11/2016 | Axmon ................ H04W 24/10 |
| 2017/0055297 | A1 | 2/2017 | Da |
| 2017/0099175 | A1* | 4/2017 | Tian ......................... H04B 7/01 |
| 2018/0167236 | A1* | 6/2018 | Li ...................... H04L 25/0204 |

OTHER PUBLICATIONS

PCT Written Opinion, dated Jan. 3, 2017, in connection with International Application No. PCT/EP2016/074459, all pages.
3GPP TSG RAN WG4 Meeting #75, R4-153659, Fukuoka, Japan, May 25-29, 2015, Modified arrangement for RRH based model, 8 pages.
3GPP TSG RAN WG4 Meeting #77, R4-157831, Anaheim, US, Nov. 16-20, 2015, Handover and Cell reselection in Unidirectional SFN, 4 pages.
3GPP TSG RAN Meeting #66, RP-141849, Maui, Hawaii (US), Dec. 8-12, 2014, , Motivation of New SI proposal: Performance enhancements for high speed scenario, 4 pages.
3GPP TSG RAN WG4 Meeting #76bis, R4-155743, Sophia Antipolis, France, Oct. 12-16, 2015, Unidirectional RRH Arrangement for HST SFN, pp. 1-11.
3GPP TSG RAN WG4 Meeting #76bis, R4-155752, Sophia Antipolis, France, Oct. 14-16, 2015, TP Simulation results for Unidirectional RRH arrangement, pp. 1-15.
3GPP TS 36.213 V12.6.0 Section 10.1.1 (Jun. 2015), 3rd Generation Partnership Project; Technical Specification Group Radio Access Network; Evolved Universal Terrestrial Radio Access (E-UTRA); Physical layer procedures (Release 12), 8 pages.
3GPP TS 36.211 V121.0 (Sep. 2015), 3rd Generation Partnership Project; Technical Specification Group Radio Access Network; Evolved Universal Terrestrial Radio Access (E-UTRA); Physical channels and modulation (Release 12), 136 pages.
3GPP TS 36331 V12.6.0 (Jun. 2015), 3rd Generation Partnership Project; Technical Specification Group Radio Access Network; Evolved Universal Terrestrial Radio Access (E-UTRA); Radio Resource Control (RRC); Protocol specification (Release 12), 449 pages.
3GPP TR 36.878 V2.0.0 (Dec. 2015), 3rd Generation Partnership Project; Technical Specification Group Radio Access Network; Study on performance enhancements for high speed scenario in LTE (Release 13), 19 pages.
3GPP TSG-RAN WG4 Meeting #77, R4-158130, Anaheim, CA, US, Nov. 16-20, 2015, TP for TR 36.878: Uplink characteristics in Unidirectional RRH arrangement, 5 pages.
3GPP TSG RAN WG4 Meeting #77, R4-158133, Anaheim, US, Nov. 16-20, 2015, TP Handover and Cell reselection in Unidirectional SFN, 4 pages.
3GPP TSG RAN WG4 Meeting #76, R4-154518, Aug. 24-28, 2015, TP Unidirectional RRH arrangement, 5 pages.
3GPP TSG RAN WG4 Meeting #76, R4-154520, Aug. 24-28, 2015, Evaluation of Unidirectional RRH arrangement for HST SFN, 3 pages.
3GPP TSG RAN WG4 meeting #76bis, R4-155758, Sophia Antipolis, France, Oct. 14-16, 2015, Priority of controlling interruptions, 2 pages.
3GPP TSG RAN WG4 Meeting #76, R4-154516, Aug. 24-28, 2015, Modified RRH Arrangement for HST SFN, 13 pages.
3GPP TSG-RAN WG4 Meeting #74bis, R4-151365, Rio de Janiro, Brazil, Apr. 20-24, 2015, Modified arrangement for RRH based model, 3 pages.
PCT International Search Report, dated Jul. 14, 2016, in connection with International Application No. PCT/EP2016/052912, all pages.
PCT Written Opinion, dated Jul. 14, 2016, in connection with International Application No. PCT/EP2016/052912, all pages.
3GPP TR 36.878 V13.0.0 (Jan. 2016); 3rd Generation Partnership Project; Technical Specification Group Radio Access Network; Study on performance enhancements for high speed scenario in LTE (Release 13); 92 pages.
PCT International Search Report, dated Jul. 25, 2016, in connection with International Application No. PCT/EP2016/053105, all pages.
PCT Written Opinion, dated Jul. 25, 2016, in connection with International Application No. PCT/EP2016/053105, all pages.
3GPP TSG RAN WG4 Meeting #76bis, R4-156658, Handover in Unidirectional SFN, Sophia Antipolis, France, Oct. 14-16, 2015, 4 pages.
3GPP TSG RAN WG4 Meeting #77, R4-158132, TP Handover and Cell reselection in Unidirectional SFN, Anaheim, US, Nov. 16-20, 2015, 2 pages.
Non-Final Office Action dated Mar. 8, 2018 in connection with U.S. Appl. No. 15/313,449, 30 pages.
Notice of Allowance dated May 7, 2019 in connection with co-pending U.S. Appl. No. 15/313,449, 13 pages.

* cited by examiner

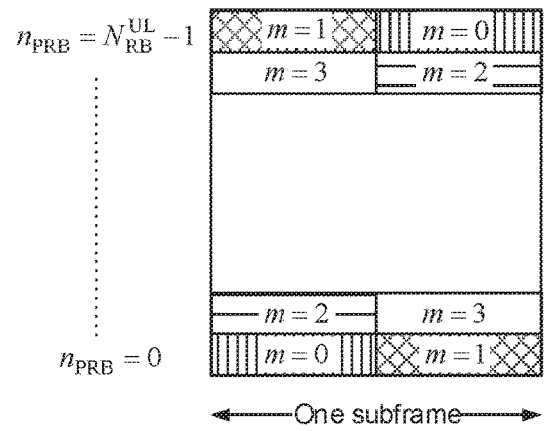
Fig. 2
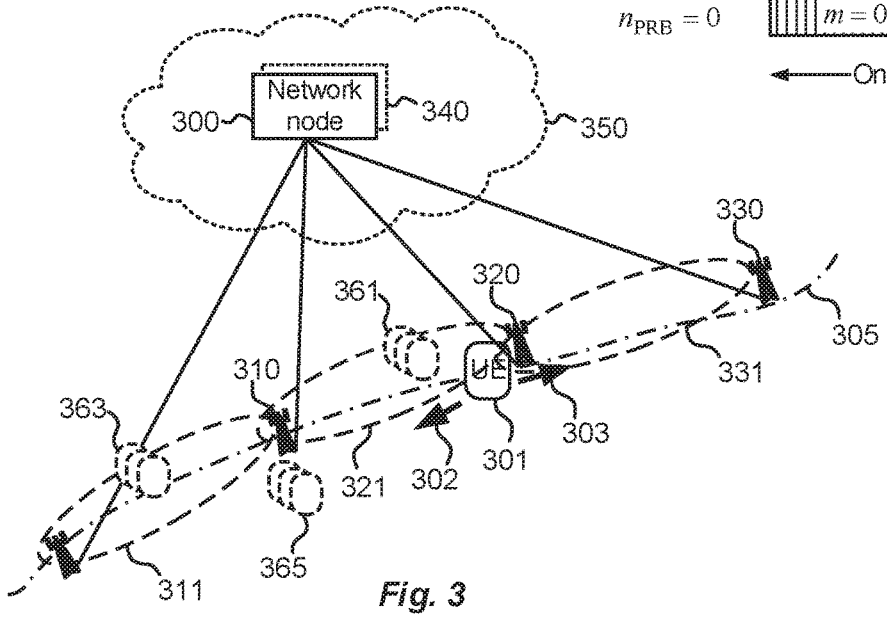
Fig. 3
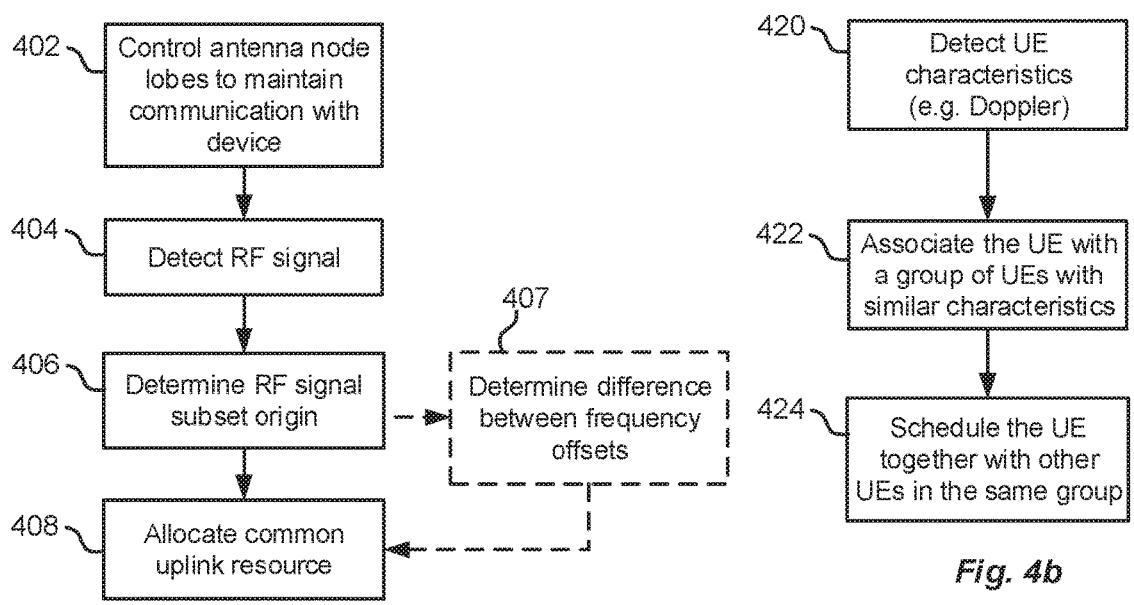
Fig. 4a
Fig. 4b

UPLINK RESOURCE ALLOCATION IN A UNIDIRECTIONAL SINGLE FREQUENCY NETWORK ARRANGEMENT FOR HIGH SPEED TRAINS

CROSS-REFERENCE TO RELATED APPLICATIONS

This application is a national stage application under 35 U.S.C. § 371 of PCT/EP2016/052912, filed Feb. 11, 2016, which claims the benefit of U.S. Provisional Application No. 62/252,627, filed Nov. 9, 2015, which applications are hereby incorporated herein by reference in their entireties.

TECHNICAL FIELD

The present invention relates to methods for allocation of uplink resources in a high speed train environment, particularly in relation to a Physical Uplink Control Channel (PUCCH) with a unidirectional remote radio head and single frequency network arrangement.

BACKGROUND

Wireless communication systems, i.e., systems that provide communication services to wireless communication devices such as mobile phones, smartphones etc. (often denoted by UE that is short for user equipment), have evolved during the last decade into systems that must utilize the radio spectrum in the most efficient manner possible. A reason for this is the ever increasing demand for high speed data communication capabilities in terms of, e.g., bitrate and to provide these capabilities at any given time, at any geographical location and also in scenarios where the wireless communication device is moving at a high speed, e.g., on board a high speed train.

To meet this demand, within the third generation partnership project, 3GPP, work is being done regarding possible enhancements to radio resource management, RRM, performance in high speed train environments. The justification is that there are railways such as Japan Tohoku Shinkansen (running at 320 km/h), German ICE (330 km/h), AGV Italo (400 km/h), and Shanghai Maglev (430 km/h) which vehicles travel at greater than 300 km/h and where there is demand for using mobile services. In a motivation contribution to 3GPP RAN #66, RP-141849, four scenarios of interest to wireless communication network operators are disclosed. In a number of these scenarios, there is a dedicated network to provide railway coverage of the cellular system; either as a standalone network, or used in conjunction with a public network which is not specifically designed to provide high speed train coverage.

For the development of the fifth generation of mobile telecommunication technology (5G), the International Telecommunication Union (ITU) has defined a set of requirements, International Mobile Telecommunications (IMT)-2020, which includes the support of UE speeds of above 500 km/h with respect to mobility and data communication.

In the standardization of the 3GPP Release 13 study item on improved performance for UE on-board high-speed trains contributions have been made relating to a new network deployment scenario—Unidirectional remote radio head (RRH) arrangement—that will allow long term evolution (LTE) UEs to meet the high speed requirements in IMT-2020 (above 500 km/h). Particularly speeds up to 750 km/h has been investigated—see for instance 3GPP meeting documents R4-155743 and R4-155752.

Apart from the relatively shortened time for detecting suitable neighbour cells for handover or cell reselection, high speed movement of the UE may also lead to significant Doppler shifts of the received radio signals. Such a Doppler shift forces the UE to increase its demodulation frequency when moving towards a cell (i.e. moving towards an antenna that defines a radio lobe of the cell), and decrease demodulation frequency when moving away from a cell, in order to maintain an acceptable receiver performance.

The Doppler shift can be expressed as:

$$\Delta f = f\left(\sqrt{\frac{1-\frac{v}{c}}{1+\frac{v}{c}}} - 1\right)$$

where c is the speed of light and v is the relative velocity of the UE towards the transmitting antenna. Referring to FIG. 1, an UE 101 is on a high speed train 103 on a railway track 104, connected to and moving away from cell A2 105 and quickly needs to detect cell B1 107 towards which the UE 101 is moving with a velocity $v_{UE}$ 109 of the train. According to current standard an antenna 111, 113 of a cell site can be as close as 2 m from the railway track 104, mainly motivated by that the wireless communication network would be integrated with the high-speed railway infrastructure. With an angle α between railway track 104 and a direction 106 to a cell antenna 113 and a UE velocity $v_{UE}$, the relative velocity v towards the transmitting antenna giving rise to Doppler shift is $v=v_{UE} \cos \alpha$.

The magnitude of the Doppler shift depends on the relative velocity of the UE 101 towards the transmitting antenna in a cell. Consequently, with transceivers located close to such a constrained path along which an UE is moving along a railway track, i.e., a small angle between the trajectory of the UE and the line between the UE and the transmitting antenna, a substantial part of the UE velocity will transfer into a Doppler shift. Moreover there will be an abrupt change of sign of the Doppler shift when the UE passes the transmitting antenna and the smaller the angle, the more abrupt is the change from positive to negative Doppler shift.

Each radio propagation path may have its own Doppler shift, depending on how the radio waves travel between the transmitting antenna and the UE. In case of line-of-sight there is one dominant path, whereas in e.g. urban areas there is generally scatter (reflections) due to buildings to which the UE has a relative velocity, giving rise to multiple paths for the signal to propagate to the UE, each with a different Doppler shift. Since the received signal (in general) is the superposition of those paths, it gives rise to Doppler spread which degrades radio receiver performance by smearing out the signal in the frequency domain hence causing inter-carrier interference.

High-speed railway track sections are generally using dedicated platforms often elevated above the landscape or city beneath. Hence, there are few objects that can cause a significant Doppler spread; with cell sites located along the track line-of-sight will be dominating at least between the cell site and the train. Moreover, in built-up areas as well as when a train is approaching or passing stations the speed is generally restricted of concern for public safety and disturbing noise, and as a consequence the Doppler shift becomes small.

However, there remain a number of challenges in relation to high-speed train scenarios in prior art. For example: in case UEs with different frequency offset characteristics have their PUCCH scheduled in the same resource block pair the orthogonality of the cover codes used for multiplexing of several sets of UEs will be broken and PUCCH decoding performance will decrease due to interference.

The Unidirectional RRH arrangement allows UEs that are traveling at high speed to maintain a downlink modulation frequency with stable frequency offset caused by the Doppler. As a result a UE in such arrangement achieves a good downlink performance. However, the system performance depends not only on the downlink but also on the uplink performance. For securing an overall good performance on system level it is important that limiting factors on the uplink are addressed and solved. One such factor is the PUCCH decoding performance.

In case it is not clear from the context in which they appear, below follows a summary of abbreviations of some of the technical terms used in the description above.

Abbreviation Explanation
  ACK Acknowledged
  BPSK Binary phase-shift keying
  CCE Control channel element
  CSI Channel state information
  CQI Channel quality indication
  FFT Fast Fourier Transform
  FDD Frequency division duplex
  HARQ Hybrid automatic repeat requestHST High speed train
  LTE Long term evolution
  MIMO Multiple input multiple output
  MME Mobility management entity
  MU-MIMO Multi-user MIMO
  NACK Not acknowledged
  PDCCH Physical downlink control channel
  PRACH Physical random access channel
  PUCCH Physical uplink control channel
  PUSCH Physical uplink shared channel
  QPSK Quadrature phase-shift keying
  RRC Radio resource control
  RRH Remote radio head
  RRU Remote radio unit
  SFN Single frequency network
  SR Scheduling request
  TDD Time division duplex
  UE User equipment
  UL Uplink

SUMMARY

An object of the present disclosure is to at least mitigate at least some of the above described drawbacks related to prior art handling of uplink radio communication resources.

Such an object is achieved, in one aspect by way of a method performed by a network node. The network node is connected to a plurality of antenna nodes that are located along a constrained path where a plurality of wireless communication devices are located. The method comprises controlling the antenna nodes to maintain reception radio lobes substantially along the path such that the wireless communication devices can perform uplink radio communication with the network node via the reception radio lobes. At least one radio frequency, RF, signal is detected and a determination is made that the detected at least one RF signal originates from a respective wireless communication device of a specific subset among said plurality of wireless communication devices. The specific subset comprises wireless communication devices that are associated with a common radio frequency offset. An allocation of a common uplink radio communication resource is then made for all wireless communication devices in the specific subset of wireless communication devices.

In other words, a unidirectional RRH arrangement (i.e. arrangement of antenna nodes) allows UEs to be clustered into a number of groups with respect to their frequency offset characteristics. Particularly, all UEs travelling onboard the same train move along a constrained path and display the same frequency offset and hence form a first group. UEs travelling on a train heading in the opposite direction form a second group, and UEs that are nearly stationary e.g. passengers waiting at the platform form a third group, and so on.

By only allowing UEs with same frequency offset characteristics to share uplink resources orthogonality and/or good cross-correlation properties among the information transmitted by said UEs can be maintained. This significantly reduces Doppler-induced interference and as a consequence improves uplink, e.g. PUCCH, decoding performance. In effect the group of UEs having similar frequency offset characteristics and sharing physical resources experiences a nearly identical scenario as had the group of UEs been stationary. With increased uplink, e.g. PUCCH, decoding performance higher speed and/or carrier frequency can be supported with intact system performance.

As will be described in some detail in the following, embodiments of the present disclosure concerns exploiting the key features of a single frequency network (SFN) with unidirectional RRH arrangement, by:

Clustering UEs with the same frequency offset characteristics into one group.

Configuring UEs within a group to have uplink resources such as PUCCH allocations that are using the same resources (resource blocks).

Detecting whether a UE deviates from the group characteristics, and if so move the UE to another group and reconfigure the UE accordingly with respect to PUCCH allocations.

In some embodiments, the determination that the detected at least one RF signal originates from a respective wireless communication device of a specific subset among said plurality of wireless communication devices comprises a determination of the radio frequency offset relative to a nominal uplink carrier frequency. The nominal uplink carrier frequency may be associated with at least one of a physical random access channel, PRACH, a physical uplink shared channel, PUSCH, a PUCCH, an uplink, UL, reference signal, and a Sounding Reference Signal, SRS.

In some embodiments, the determination that the detected at least one RF signal originates from a respective wireless communication device of a specific subset among said plurality of wireless communication devices comprises a determination of a velocity of a wireless communication device. The radio frequency offset is then based on the determined velocity. In these embodiments, the determination of a velocity may comprise obtaining predetermined information available to the network node. This predetermined information may comprise information associated with geographic locations of antenna nodes in relation to the path.

In some embodiments, the allocation of a common uplink radio communication resource may comprise any of allocating a common PUCCH resource and allocating a common PUSCH resource. Any of said PUCCH resource and PUSCH resource may comprise at least one pair of resource blocks.

In some embodiments, a first subset of wireless communication devices may be associated with a first common radio frequency offset and a second subset of wireless communication devices may be associated with a second common radio frequency offset. A determination is made of a difference between the first and second common radio frequency offset and an allocation is then made, in dependence on the determination of the difference, for all wireless communication devices in the first and second subset of wireless communication devices, of a respective first and second common uplink radio communication resource.

The embodiments where the allocation of a common uplink radio communication resource comprises allocating a common PUCCH resource comprise allocating a guard frequency interval between the PUCCH resource and a PUSCH resource.

In some embodiments, the allocation of a common uplink radio communication resource may comprise a transmission of a radio resource control, RRC, connection reconfiguration message that comprises configuration information for the uplink radio communication resource. In these embodiments, where the common uplink radio communication resource is a PUCCH, the information for the uplink radio communication resource comprises a PUCCH configuration.

The embodiments where the allocation of a common uplink radio communication resource comprises allocating a common PUCCH resource comprise a selection of an integer number, m, which defines a physical resource to be used. A transmission is then made of at least one configuration message for channel quality indication, CQI, reporting, said message comprising the integer number m. In these embodiments, the allocation of a common uplink radio communication resource may comprise setting a value on a parameter, cqi-PUCCH-ResourceIndex, which represents periodicity of reporting and physical resources for use for the reporting of the integer number m. The transmission of of at least one configuration message for CQI reporting then further comprises this parameter cqi-PUCCH-ResourceIndex.

In some embodiments, the allocation of a common uplink radio communication resource may comprise performing scheduling of a physical downlink control channel, PDCCH.

Another aspect of the present disclosure is a network node configured to be connected to a plurality of antenna nodes that are located along a constrained path where a plurality of wireless communication devices are located. The network node comprises input/output circuitry, a processor and a memory. The memory contains instructions executable by said processor whereby the network node is operative to:
- control the antenna nodes to maintain reception radio lobes substantially along the path such that the wireless communication devices can perform uplink radio communication with the network node via the reception radio lobes,
- detect at least one radio frequency, RF, signal,
- determine that said detected at least one RF signal originates from a respective wireless communication device of a specific subset among said plurality of wireless communication devices, said specific subset comprising wireless communication devices that are associated with a common radio frequency offset, and
- allocate, for all wireless communication devices in said specific subset of wireless communication devices, a common uplink radio communication resource.

Embodiments of the network node that correspond to the various method embodiments summarized above are also provided.

In another aspect there is provided a computer program, comprising instructions which, when executed on at least one processor in a network node, cause the network node to carry out the method as summarized above in connection with the first aspect and the various embodiments of this aspect.

In another aspect there is provided a carrier comprising a computer program according to the summarized aspect above, wherein the carrier is one of an electronic signal, an optical signal, a radio signal and a computer readable storage medium.

These other aspects provide the same effects and advantages as summarized above in connection with the method of the first aspect.

BRIEF DESCRIPTION OF THE DRAWINGS

FIG. 4a is a flowchart of a method,
FIG. 4b is a flowchart of a method,
FIG. 5 schematically illustrates resource block mapping,
FIG. 6 schematically illustrates a wireless communication system,
FIG. 7 schematically illustrates functional blocks in a network node and in antenna nodes,
FIG. 8 schematically illustrates a network node, and
FIG. 9 schematically illustrates a network node.

DETAILED DESCRIPTION

Figure 1:
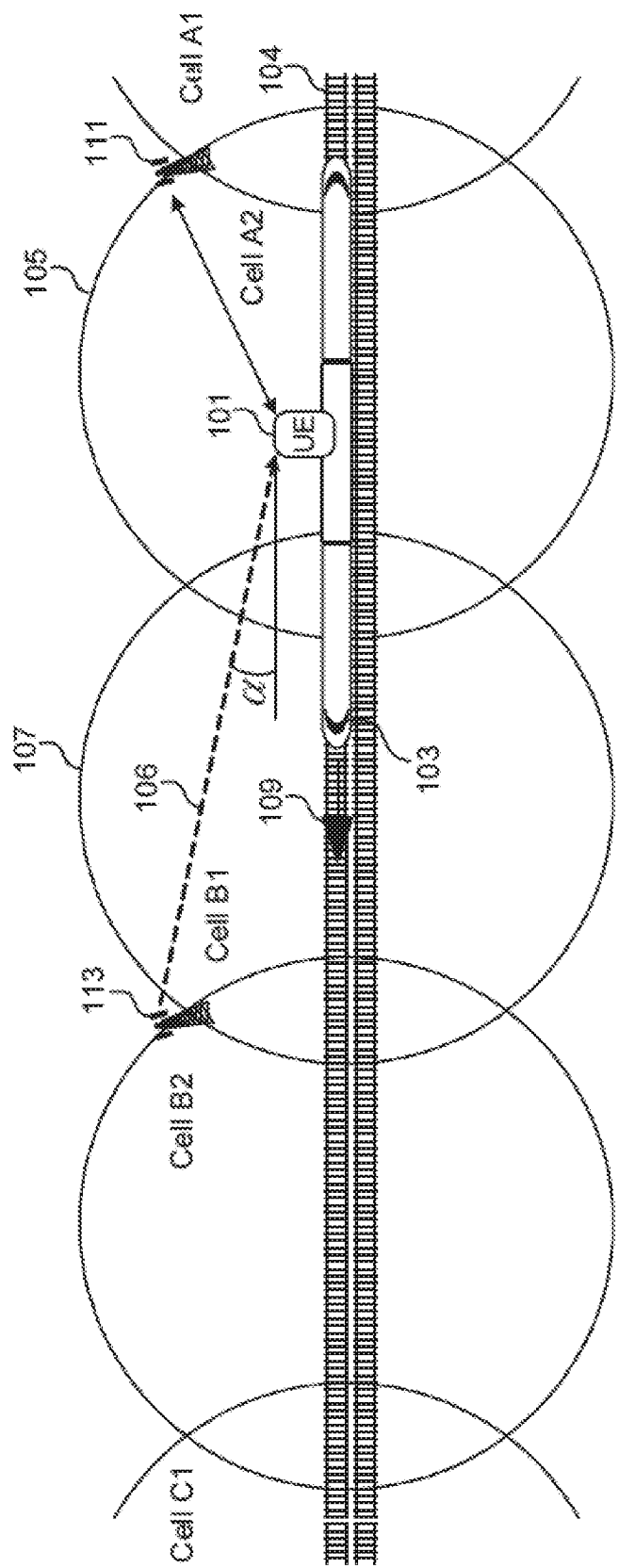
FIG. 1 schematically illustrates a HST scenario,
FIG. 2 schematically illustrates resource block mapping according to prior art,
FIG. 3 schematically illustrates a HST scenario.

As will be described in some detail below, allocation of uplink resources may involve allocation of resource blocks in physical uplink channels such as PUCCH and PUSCH. Therefore, it is appropriate in the present context to exemplify how one uplink resource, PUCCH, may be formatted in a 3GPP communication system.

Up to and including LTE Rel.12 there are two PUCCH formats that are used for single component carrier scenarios (3GPP TS 36.213, V12.6.0, section 10.1.1):
PUCCH format 1/1a/1b
  Format 1a for 1-bit HARQ-ACK or in case of FDD or FDD-TDD primary cell frame structure type 1 for 1-bit HARQ-ACK with positive SR.
  Format 1b for 2-bit HARQ-ACK or for 2-bit HARQ-ACK with positive SR.
  Format 1b for up to 4-bit HARQ-ACK with channel selection when the UE is configured with more than one serving cell or, in the case of TDD, when the UE is configured with a single serving cell.
  Format 1 for positive SR.
PUCCH format 2
  Format 2 for a CSI report when not multiplexed with HARQ-ACK.
  Format 2a for a CSI report multiplexed with 1-bit HARQ-ACK for normal cyclic prefix.
  Format 2b for a CSI report multiplexed with 2-bit HARQ-ACK for normal cyclic prefix.
  Format 2 for a CSI report multiplexed with HARQ-ACK for extended cyclic prefix.

The physical uplink control channel supports multiple formats as shown in the following table (Table 5.4-1 in 3GPP TS 36.211).

Formats 2a and 2b are supported for normal cyclic prefix only. (3GPP TS 36.211 V12.7.0).

Supported PUCCH Formats

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

The physical resources used for PUCCH are defined via a parameter m and the slot number within the radio frame (0 ... 19), according to the following expression. $n_{PRB}$ is the physical resource block number and n is the slot number:

$$n_{PRB} = \begin{cases} \lfloor \frac{m}{2} \rfloor & \text{if } (m + n_s \bmod 2) \bmod 2 = 0 \\ N_{RB}^{UL} - 1 - \lfloor \frac{m}{2} \rfloor & \text{if } (m + n_s \bmod 2) \bmod 2 = 1 \end{cases}$$

Figure 5:
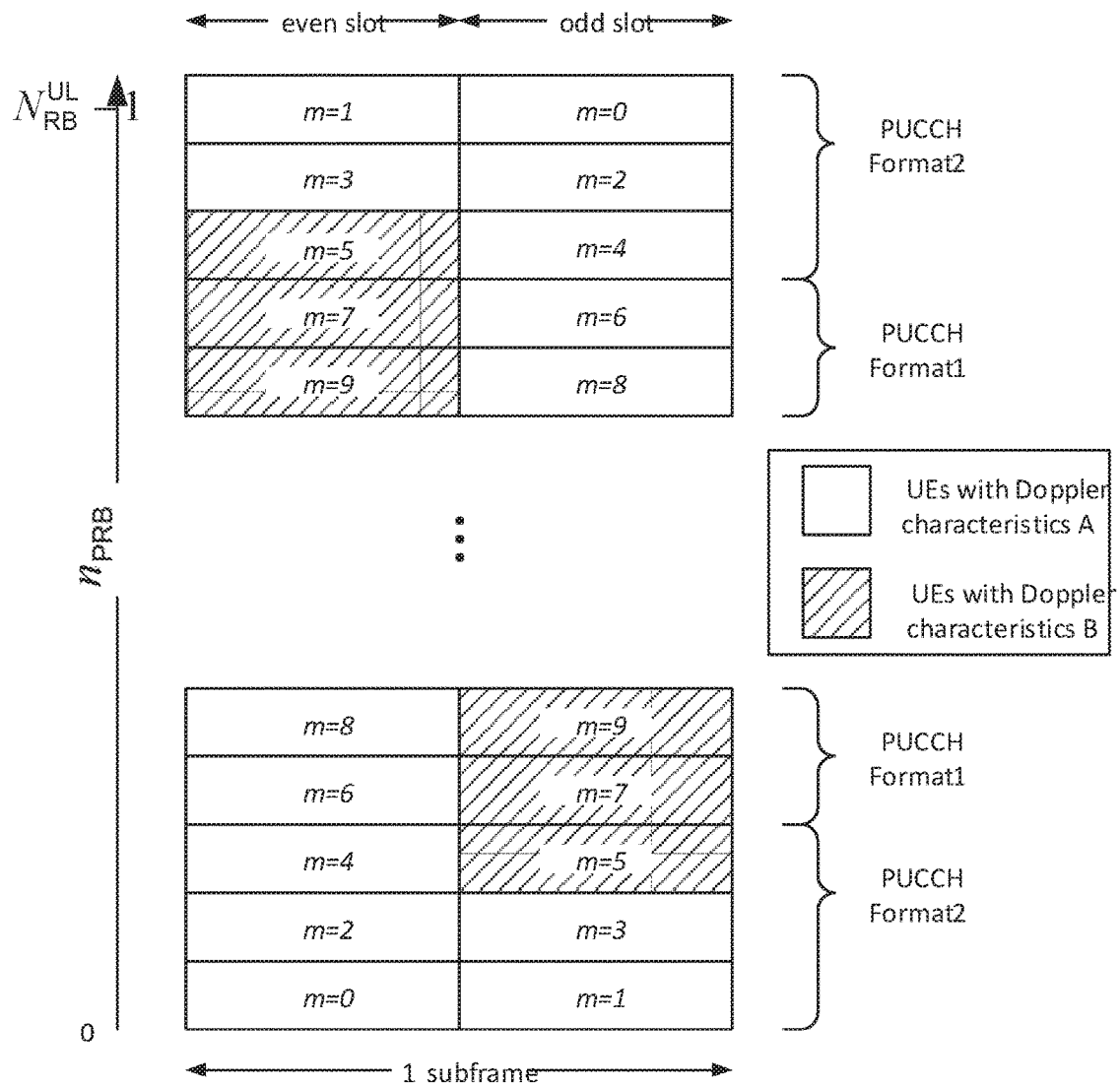

The mapping of physical resource blocks for PUCCH for different values of m is illustrated in FIG. 2 (corresponding to figure 5.4.3-1 in 3GPP TS 36.211). As FIG. 2 exemplifies, the PUCCH occupies four resource block pairs at the extremes of the UL cell bandwidth. The remaining physical resources shown as blank are used for PUSCH.

The value of m is determined differently depending on the PUCCH format. For PUCCH format 1, it is determined from the following expression where [arg] denotes the floor operation and [arg] the ceiling) operation (operating on the argument).

$$m = \begin{cases} N_{RB}^{(2)} & \text{if } n_{PUCCH}^{(1,\tilde{p})} < c \cdot N_{cs}^{(1)}/\Delta_{shift}^{PUCCH} \\ \left\lfloor \frac{n_{PUCCH}^{(1,\tilde{p})} - c \cdot N_{cs}^{(1)}/\Delta_{shift}^{PUCCH}}{c \cdot N_{sc}^{RB}/\Delta_{shift}^{PUCCH}} \right\rfloor + N_{RB}^{(2)} + \left\lceil \frac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases}$$

where $N_{RB}^{(2)}$, $N_{cs}^{(1)}$ and $\Delta_{shift}^{PUCCH}$ are parameters provided by RRC, and where $n_{PUCCH}^{(1,\tilde{p})}$ is a parameter that is derived by $$n_{PUCCH}^{(1,\tilde{p}0)} = n_{CCE} + N_{PUCCH}^{(1)}$$

where $n_{CCE}$ is the lowest CCE index of the PDCCH received four sub-frames earlier, and $N_{PUCCH}^{(1)}$ is a parameter provided by RRC.

The parameter $N_{RB}^{(2)}$ represents the number of resource blocks that are reserved for usage by PUCCH format 2. In case $N_{cs}^{(1)}$ is set to zero, there will not be any overlap in resource usage by PUCCHs with format 1 and 2, respectively.

Observations for PUCCH Format 1:
The eNodeB can decide where (which m) to schedule a UE on PUCCH by taking it into account when scheduling the same UE on PDCCH four sub-frames earlier.

The eNodeB can decide not to have mixed mode, i.e., different PUCCH formats in the same physical resource.

PUCCHs with format 1 uses 12 phase rotated sequences and 3 orthogonal cover sequences, thereby allowing up to 36 UEs to share the same physical resource in ideal radio conditions. In practice fewer than 12 of the phase rotated sequences can be used and the number of UEs that can share a physical resource is generally 18-24.

For PUCCH format 2 the value of in is determined from:

$$m = \lfloor n_{PUCCH}^{(2,\tilde{p})}/N_{sc}^{RB} \rfloor$$

where $N_{sc}^{RB}=12$ is a fixed constant in LTE (the number of subcarriers in a resource block), and $n_{PUCCH}^{(2,\tilde{p})}$ is derived from cqi-PUCCH-Resource Index which is a UE-specific configuration provided by the eNodeB when configuring periodic CQI reporting via RRC Connection Setup or RRC Connection Reconfiguration messages.

Observation for PUCCH format 2:
PUCCH format 2 is used for periodic CQI reporting.
The eNodeB configures periodic CQI reporting via dedicated signaling to the UE.

PUCCHs with format 2 from up to 12 UEs simultaneously can be sharing the same physical resource by using code division multiplexing by means of orthogonal sequences.

The eNodeB can decide where (which m) to schedule a UE on PUCCH by taking it into account when configuring periodic CQI reporting, and particularly by selecting a suitable parameter value for cqi-PUCCH-ResourceIndex.

Referring now to FIG. 3, a network node 300 is connected to a plurality of antenna nodes 310, 320, 330 that are located along a constrained path 305 where a plurality of wireless communication devices, including a wireless communication device 301, are located, the wireless communication device 301 may be in motion as indicated by a velocity vector 302 in a first movement direction and a velocity vector 303 in a second movement direction that is opposite the first movement direction. The path 305 is constrained in that the antenna nodes 310, 320, 330 are located close to the path 305 and as a consequence there is typically a small angle between the trajectory (i.e. movement direction) of a wireless communication device and a line between the wireless communication device and the antenna node. For example, in a scenario involving a railway track as in FIG. 1, a wireless communication device may only be in motion along the railway track with known geometry between the antenna nodes and the path/railway track.

FIG. 3 further illustrates a plurality of other wireless communication devices, including groups or subsets 361, 363, 365 of wireless communication devices that are located such that they are either moving or being more or less stationary, i.e. non-moving, as discussed above.

The antenna nodes 310, 320, 330 are controlled to maintain a respective reception radio lobe 311, 321, 331. As the skilled person will realize, the antenna nodes 310, 320, 330 may also maintain respective transmission radio lobes. Such transmission radio lobes are omitted from FIG. 3 for the sake of avoiding unnecessary detail when illustrating the embodiments of the present disclosure. The lobes 311, 321, 331 are substantially along the path 305 such that the wireless communication device 301 during movement along the path 305, can communicate with the network node 300 via consecutive reception radio lobes. When moving in the direction defined by velocity vector 302, the wireless communication device 301 communicates via consecutive reception radio lobes 331, 321, 311 of consecutive antenna nodes 330, 320, 310 behind the wireless communication device 301. Conversely, when moving in the direction defined by velocity vector 303, the wireless communication device 301 communicates via consecutive reception radio lobes 311, 321, 331 of consecutive antenna nodes 310, 320, 330 ahead of the wireless communication device 301. When moving in any direction 302, 303 RF signals transmitted by the wireless communication device 301 will be subject to a Doppler frequency shift when detected via a reception radio lobe maintained by an antenna node such as any of the antenna nodes 310, 320, 330.

As indicated in FIG. 3, it is to be noted that the network node 300 may be considered as a single entity as well as a combination of a plurality of entities 340. For example, the network node 300 may be distributed, in terms of functionality as well as in terms of physical hardware, over one or more processing units that are residing in a logical entity 350 that may be defined as a "cloud".

As will be exemplified below, the network node 300 may also be in the form of a node in a 3GPP long term evolution (LTE) system.

Turning now to FIG. 4a, and with continued reference to FIG. 3, a method will be described with reference to a number of actions that are performed by a network node, such as the network node 300.

Action 402

The antenna nodes 310, 320, 330 are controlled to maintain reception radio lobes 311, 321, 231. The lobes 311, 321, 331 are substantially along the path 305 such that the wireless communication devices 301, 361, 363, 365 can perform uplink radio communication with the network node 300 via the reception radio lobes 311, 321, 331.

Action 404

A detection is made of at least one radio frequency (RF) signal.

Action 406

A determination is made that the detected at least one RF signal, in action 402, originates from a respective wireless communication device 301 of a specific subset 361, 363, 365 among the plurality of wireless communication devices, the specific subset comprising wireless communication devices that are associated with a common radio frequency offset.

For example, the determination that the detected at least one RF signal originates from a respective wireless communication device 301 of a specific subset 361, 363, 365 among the plurality of wireless communication devices may comprise a determination of the radio frequency offset relative to a nominal uplink carrier frequency.

For example, the nominal uplink carrier frequency may be associated with at least one of a PRACH, a PUSCH, a PUCCH, an UL reference signal and an SRS.

In other examples, this determination that the detected at least one RF signal originates from a respective wireless communication device 301 of a specific subset 361, 363, 365 among the plurality of wireless communication devices may comprise a determination of a velocity of a wireless communication device. The radio frequency offset may then be determined based on this determined velocity. In these examples, the determination of a velocity may, in some embodiments, comprise obtaining predetermined information available to the network node 300, where the predetermined information may comprise information associated with geographic locations of antenna nodes 310, 320, 330 in relation to the path 305.

Moreover, radio frequency offset may in some embodiments also be obtained by way of correlating one or more wireless communication device properties such as velocity (speed and direction) with the same properties for other wireless communication devices to determine the frequency offset by proxy.

The determination that the detected at least one RF signal originates from a respective wireless communication device of a specific subset may in some embodiments involve comparing the determined frequency offset with characteristic frequency offset for each group, and if close enough, assigning the wireless communication device to the closest group (subset); otherwise assigning the wireless communication device to a new group (subset).

Action 408

A common uplink radio communication resource is then allocated for all wireless communication devices in the specific subset of wireless communication devices.

For example, the allocation of a common uplink radio communication resource may comprise any of allocating a common PUCCH resource and allocating a common PUSCH resource. These PUCCH and/or PUSCH resources may comprise at least one pair of resource blocks.

Such embodiments are useful in a scenario where two wireless communication devices having similar frequency offset properties are allocated the same PUSCH resource in multiuser MIMO (MU-MIMO) operation. Moreover, in scenarios involving multiple wireless communication devices with similar frequency offset properties, the wireless communication devices are allocated the same PUCCH resource and are overlaid by usage of orthogonal codes and/or sequences with low cross-correlation.

In some embodiments, it has been determined, via actions 404 and 406, that a first subset (e.g. subset 363) of wireless communication devices is associated with a first common radio frequency offset and a second subset (e.g. subset 365) of wireless communication devices is associated with a second common radio frequency offset. A difference may then be determined, as illustrated by an optional action 407, between the first and second common radio frequency offset. The allocation, in action 408 may then be performed in dependence on the determination of this difference. That is, for all wireless communication devices in the first subset (e.g. subset 363) and second subset (e.g. subset 365) of wireless communication devices, a respective first and second common uplink radio communication resource is allocated.

Such embodiments, at least those where PUCCH resources are scheduled to groups of wireless communication devices in dependence of frequency offset between the groups, avoid or reduce interference.

In some embodiments, wherein the allocation of a common uplink radio communication resource comprises allocation of a PUCCH resource, the allocation of a common PUCCH resource comprises allocating a guard frequency interval between the PUCCH resource and a PUSCH resource.

In some embodiments, allocation of a common uplink radio communication resource comprises a transmission of a RRC connection reconfiguration message that comprises configuration information for said uplink radio communication resource. In the embodiments wherein the common uplink radio communication resource is a PUCCH, the information for the uplink radio communication resource comprises a PUCCH configuration.

A PUCCH configuration may comprise, e.g., one or more of the non-limiting list of parameters: deltaPUCCH-Shift ($\Delta_{shift}^{PUCCH}$), nRB-CQI($N_{RB}^{(2)}$), nCS-AN ($N_{cs}^{(1)}$), n1PUCCH-AN ($N_{PUCCH}^{(1)}$), ackNackRepetition, tdd-AckNackFeedbackMode, n1PUCCH-AN-CS ( ), twoAntennaPortActivatedPUCCH-Format1a1b, pucch-Format, simultaneousPUCCH-PUSCH, n1PUCCH-AN-RepP0, n1PUCCH-AN-RepP1, nPUCCH-Identity, n1PUCCH-AN, and nkaPUCCH-AN, as specified in 3GPP TS 36.331 V12.6.0 clause 6.3.2.

In some embodiments, wherein the allocation of a common uplink radio communication resource comprises allocation of a PUCCH resource, the allocation of a common uplink radio communication resource comprises selecting an integer number m that defines a physical resource to be used. At least one configuration message for channel quality indication, CQI, reporting is transmitted where the message comprises the integer number m. Such embodiments may involve setting a value on a parameter, cqi-PUCCH-ResourceIndex, which represents periodicity of reporting and physical resources for use for the reporting of the integer number m. The transmission of at least one configuration message for CQI reporting then further comprises the parameter cqi-PUCCH-ResourceIndex.

Allocation of a common uplink radio communication resource may comprise performing scheduling of a physical downlink control channel, PDCCH.

FIG. 4b is another example of an embodiment comprising a number of actions.

Action 420

A detection is made of wireless communication device characteristics, e.g. Doppler characteristics, which corresponds to the frequency offset discussed above in connection with FIG. 4a.

Action 422

An association is made of the wireless communication device with a group of wireless communication device with similar frequency offset characteristics.

Action 424

A scheduling is made of the wireless communication device together with other wireless communication device in the same group.

One or more of the embodiments described above illustrate the following:

A network node (e.g. an eNodeB) classifies each wireless communication device into one or more groups depending on the estimated frequency offset caused by Doppler shift using conventional methods. The classification may be repeated when the network node (e.g. an eNodeB) detects that a particular wireless communication device is deviating from any of the properties that are defining the group to which it has been assigned, e.g. the Doppler frequency. In this context, "classification" may be considered as being realized by the determination of a frequency offset comprised in action 406.

In case the wireless communication device is moved from one group to another (e.g. by way of a determination that a frequency offset determination comprised in action 406 finds that the frequency offset has changed from a first value to a second value), the network node (e.g. an eNodeB) may reconfigure the CQI reporting and particularly the parameter cqi-PUCCH-ResourceIndex such that the wireless communication device only shares physical resources with other wireless communication devices in the same group when PUCCH format 2 is used.

Moreover the network node (e.g. an eNodeB) may schedule PDCCH for the wireless communication devices in the concerned group in such manner that only wireless communication devices in the same group are sharing physical resources for PUCCH format 1. By doing so the network node (e.g. an eNodeB) reduces the interference and thereby improves the PUCCH decoding performance.

For example, frequency characteristic (e.g. in the form of frequency offset) may be used as a priori information when decoding a signal from a wireless communication device, as is conventional, but here expanded to apply with the same frequency characteristics within said group. The decoding may involve frequency compensation on time domain signals before calculating the FFT (Fast Fourier Transform), or frequency offset compensation after having calculated the FFT (filter leakage between FFT bins). Alternatively, instead of adjusting the analogue frequency to match the frequency of the received signal one receives it with a frequency offset and then compensates e.g. before calculating the FFT. The compensation is essentially multiplication by a sequence of complex sinusoids.

In case the frequency offset difference between the two groups is large, say exceeding 2500 Hz (depending on implementation choices), the network node (e.g. an eNodeB) may further consider (as part of action 408) leaving a guard (empty resources) between PUSCH and PUCCH by not allocating the concerned physical resource blocks to prevent PUSCH and PUCCH from interfering with each other. Moreover the network node (e.g. an eNodeB) may consider which group of wireless communication devices to schedule in which physical PUCCH resources to avoid or reduce interference caused by frequency offset between the groups.

When allocating PUCCH resources together with allocating PUSCH resources (as part of action 408), two wireless communication devices with similar frequency offset properties are suitably allocated the same PUSCH resource in multiuser MIMO (MU-MIMO) operation.

This is illustrated by an example presented in FIG. 5 where there are two groups of wireless communication devices with Doppler characteristics A and B, respectively. The network node (e.g. an eNodeB) allocates different PUCCH resources to groups A and B to avoid that wireless communication devices with Doppler characteristic A is sharing physical resources with wireless communication devices with Doppler characteristics B. As in FIG. 2, the physical resources shown as blank are used for PUSCH.

As is known, the range of $n_{prb}$ depends on the cell bandwidth: with 1.4 MHz $n_{prb}$=0 . . . 5, 20 MHz $n_{prb}$= 0 . . . 99, etc. and the range of in depends on how many resources are reserved for PUCCH.

Figure 6:
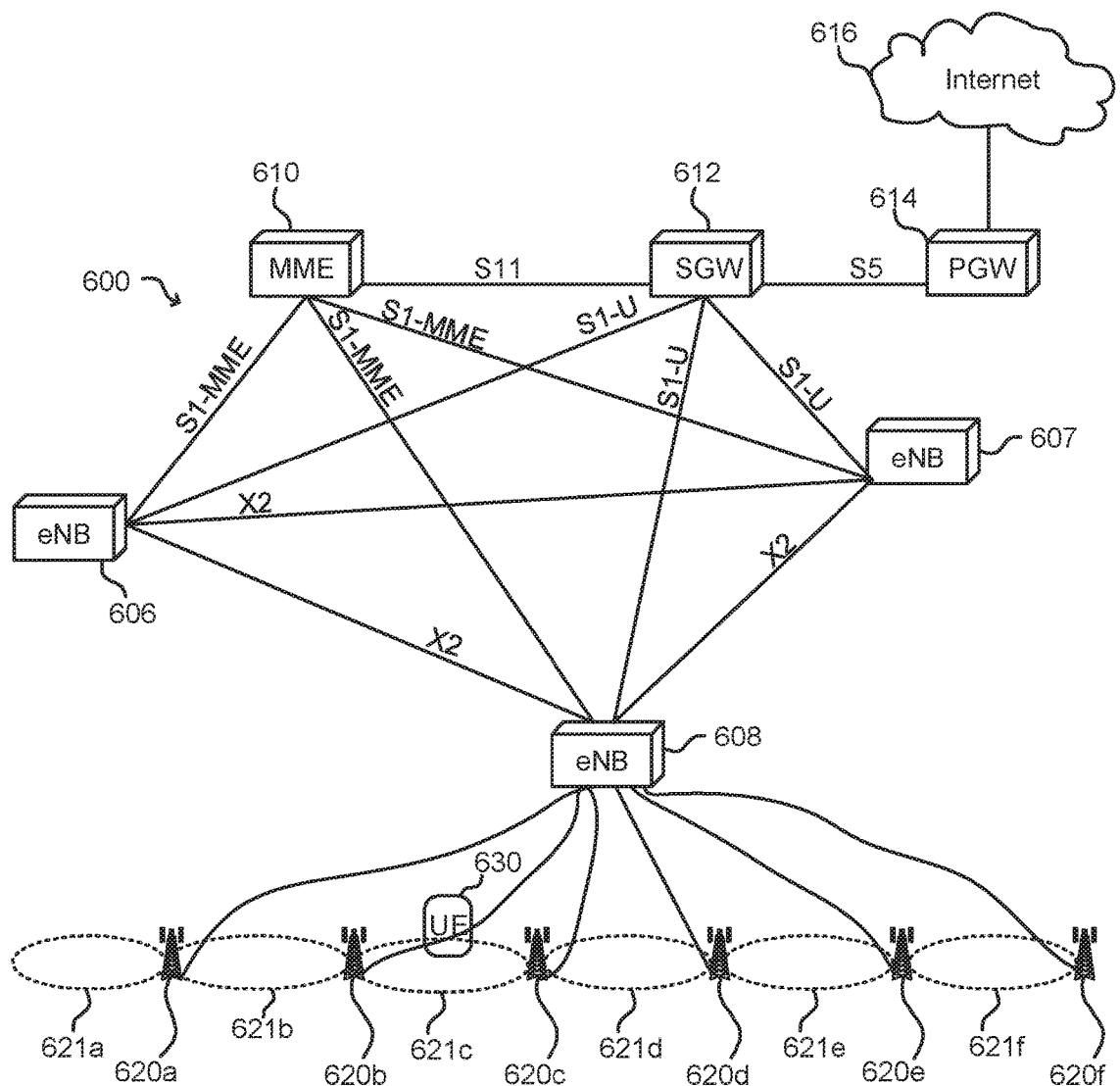

Turning now to FIG. 6, which illustrates parts of a 3GPP long term evolution, LTE, wireless network 600 and a compatible core network. Base stations (enhanced NodeB, eNodeB or eNB) 606, 607, 608 are communicating with each other over an X2 interface. The base stations 606, 607 and 608 are connected to a mobility management entity, MME, 610, which keeps information about UEs (i.e. UE contexts) regarding capabilities etc., which the MME 610 shares, e.g., with base stations connected to it. The MME 610 is also managing handover of a UE from one MME to another when a UE leaves the pool of base stations managed by a source MME, or when the X2 connection is missing between the source and target base stations.

The base stations 606, 607 and 608 are further connected to a serving gateway, SGW, 612, which is handling the user data plane transport to and from the base station to which a UE is connected, and to one or more packet data network gateways, PGW, 614, which connect UEs to the internet 616. The MME in whose pool of base stations a UE resides configures which base station the SGW shall connect to for transport of the UE user plane data.

In FIG. 6, the base station 608 is a network node as defined above and the base station/network node 608 is connected to a number of antenna nodes 620a-f. The base station/network node 608 controls the antenna nodes 620a-f as discussed herein and thereby maintaining respective radio lobes 621a-f. A UE 630 is illustrated, which may correspond to any wireless communication device described herein.

Processing of signals, as exemplified above, may be handled by a single network node such as an eNodeB (as indicated in FIG. 6) using antenna nodes in the form of remote radio heads, RRH, or remote radio units, RRU, for the individual radio lobes 621a-f. Processing of signals may in other embodiments be handled by a group of eNodeBs with or without RRHs or RRUs operating in a cooperative manner, or such group of eNodeBs under coordination of another network node, either a new entity or an existing one with extended functionality, e.g. an MME.

Figure 7:
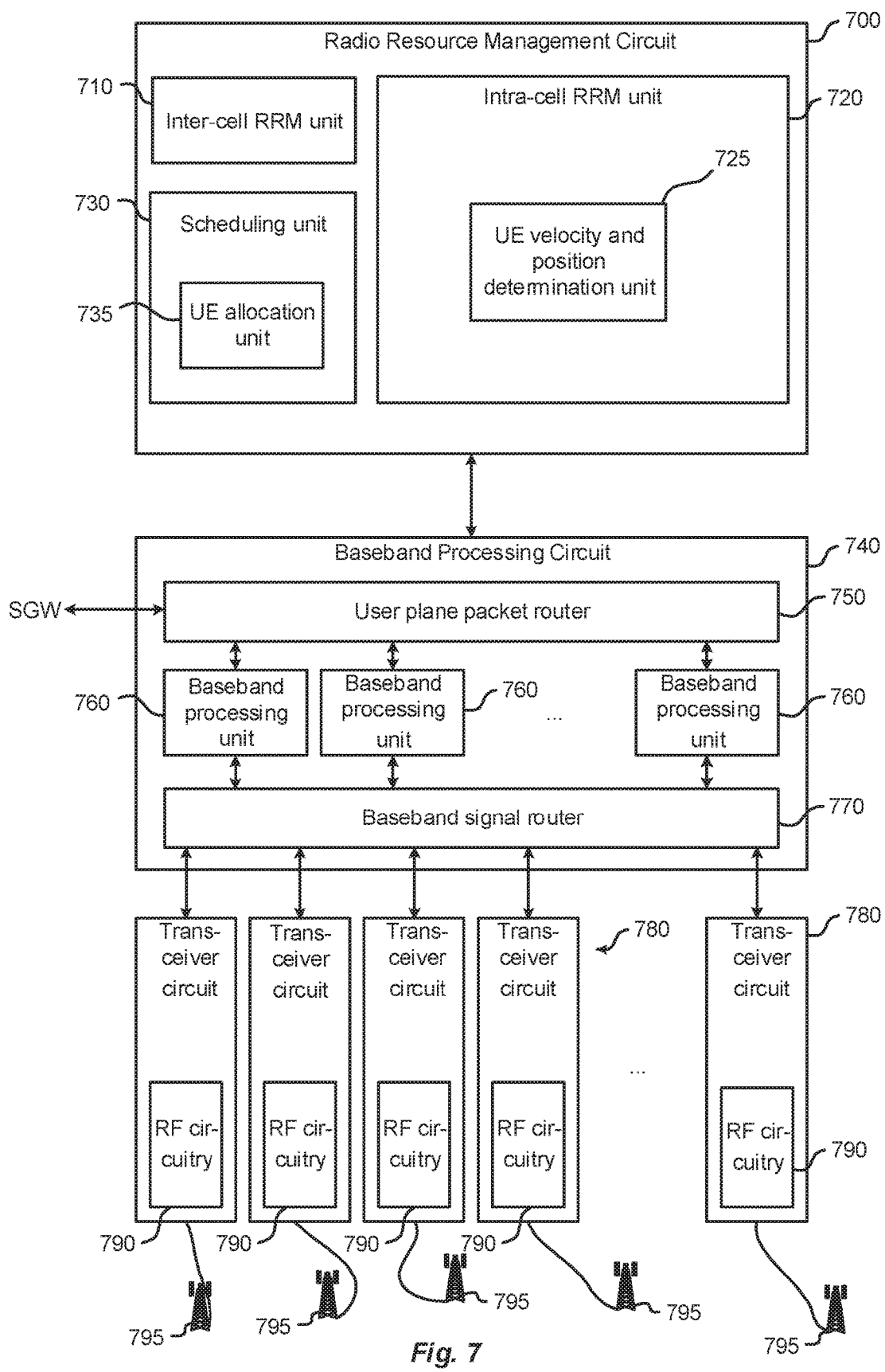

Turning now to FIG. 7, an example of arrangements, in the form of functional blocks, in a network node will be described in some more detail. The arrangements in FIG. 7 may be comprised in any of the network nodes discussed above in connection with FIGS. 3 and 6.

A radio resource management (RRM) circuit 700 comprises an Inter-cell RRM unit 710 for handling information and processing in relation to mobility of wireless communication devices between cells in a wireless communication network, e.g. a single frequency network (SFN), where cells may have one and the same or different physical cell identities.

An intra-cell RRM unit 720 is comprised in the RRM circuit 700, the intra-cell RRM unit 720 being capable of handling information and processing in relation to mobility within a cell (e.g. part of a SFN cell) managed by this network node, e.g. eNodeB.

The Intra-RRM unit 720 further comprises a velocity and position determination unit 725 that is configured to determine position and velocity of wireless communication devices based on various kinds of measurements (e.g. as discussed herein).

A scheduling unit 730 is configured, in addition to scheduling operations that are outside of the present disclosure, to handle scheduling of communication as described herein.

A baseband processing unit 740 comprises one or more baseband processing units 760 connected to a SGW via a user plane packet router 750, and connected to transceiver circuits 780 comprising RF circuitry 790 via a baseband signal router 770. Connection with antenna nodes 795 is realized via the transceiver circuits 780.

Figure 8:
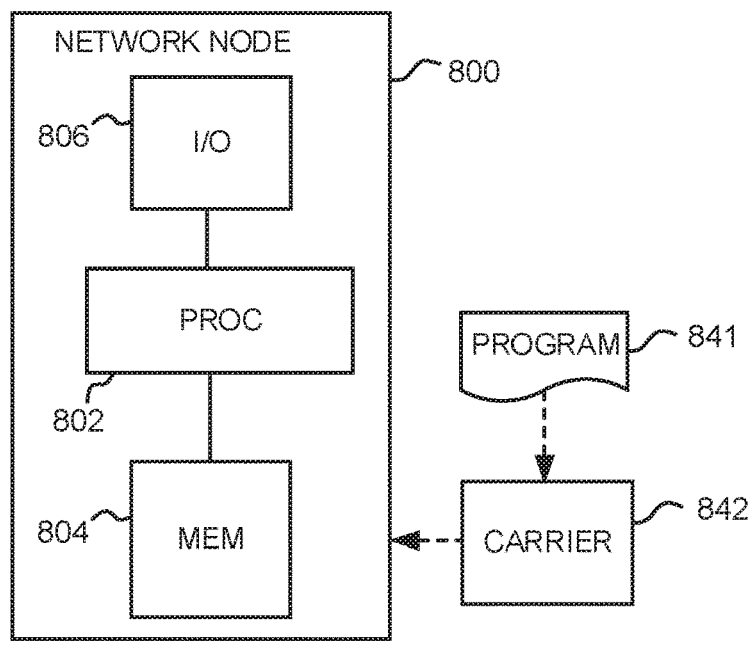

Turning now to FIG. 8, a schematically illustrated network node 800 will be described in some more detail. The network node 800 is configured to be connected to a plurality of antenna nodes that are located along a constrained path where a plurality of wireless communication devices are located. The network node 800 comprises input/output circuitry 806, a processor 802 and a memory 804. The memory 804 contains instructions executable by the processor 802 whereby the network node 800 is operative to:

control the antenna nodes to maintain reception radio lobes substantially along the path such that the wireless communication devices can perform uplink radio communication with the network node via the reception radio lobes, detect at least one radio frequency, RF, signal, determine that said detected at least one RF signal originates from a respective wireless communication device of a specific subset among said plurality of wireless communication devices, said specific subset comprising wireless communication devices that are associated with a common radio frequency offset, and allocate, for all wireless communication devices in said specific subset of wireless communication devices, a common uplink radio communication resource.

The instructions that are executable by the processor 802 may be software in the form of a computer program 841. The computer program 841 may be contained in or by a carrier 842, which may provide the computer program 841 to the memory 804 and processor 802. The carrier 842 may be in any suitable form including an electronic signal, an optical signal, a radio signal or a computer readable storage medium.

In some embodiments, the network node 800 is operative such that the determination that said detected at least one RF signal originates from a respective wireless communication device of a specific subset among said plurality of wireless communication devices comprises determining the radio frequency offset relative to a nominal uplink carrier frequency.

In some embodiments, the network node 800 is operative such that said nominal uplink carrier frequency is associated with at least one of a PRACH, a PUSCH, a PUCCH, an UL reference signal, and a SRS.

In some embodiments, the network node 800 is operative such that said determination that said detected at least one RF signal originates from a respective wireless communication device of a specific subset among said plurality of wireless communication devices comprises determining a velocity of a wireless communication device, and determining said radio frequency offset based on said determined velocity.

In some embodiments, the network node 800 is operative such that said determination of a velocity comprises obtaining predetermined information available to the network node, said predetermined information comprising information associated with geographic locations of antenna nodes in relation to the path.

In some embodiments, the network node 800 is operative such that said allocation of a common uplink radio communication resource comprises any of allocating a common PUCCH resource, and allocating a common PUSCH resource.

In some embodiments, the network node 800 is operative such that any of said PUCCH resource and PUSCH resource comprises at least one pair of resource blocks.

In some embodiments, the network node 800 is operative such that:

a first subset of wireless communication devices is associated with a first common radio frequency offset, a second subset of wireless communication devices is associated with a second common radio frequency offset, and the operative to:

determine a difference between said first and second common radio frequency offset, and allocate, in dependence on the determination of said difference, for all wireless communication devices in the first and second subset of wireless communication devices, a respective first and second common uplink radio communication resource.

In some embodiments, the network node 800 is operative such that said allocation of a common PUCCH resource comprises allocating a guard frequency interval between the PUCCH resource and a PUSCH resource.

In some embodiments, the network node 800 is operative such that said allocation of a common uplink radio communication resource comprises transmitting a radio resource control, RRC, connection reconfiguration message that comprises configuration information for said uplink radio communication resource.

In some embodiments, the network node 800 is operative such that said common uplink radio communication resource is a PUCCH and said information for said uplink radio communication resource comprises a PUCCH configuration.

In some embodiments, the network node 800 is operative such that said allocation of a common uplink radio communication resource comprises:
- selecting an integer number, m, that defines a physical resource to be used, and
- transmitting at least one configuration message for CQI reporting, said message comprising the integer number m.

In some embodiments, the network node 800 is operative such that said allocation of a common uplink radio communication resource comprises:
- setting a value on a parameter, cqi-PUCCH-ResourceIndex, representing periodicity of reporting and physical resources for use for said reporting of said integer number m, and wherein said transmission of at least one configuration message for CQI reporting further comprises the parameter cqi-PUCCH-ResourceIndex.

In some embodiments, the network node 800 is operative such that said allocation of a common uplink radio communication resource comprises performing scheduling of a PUCCH.

Figure 9:
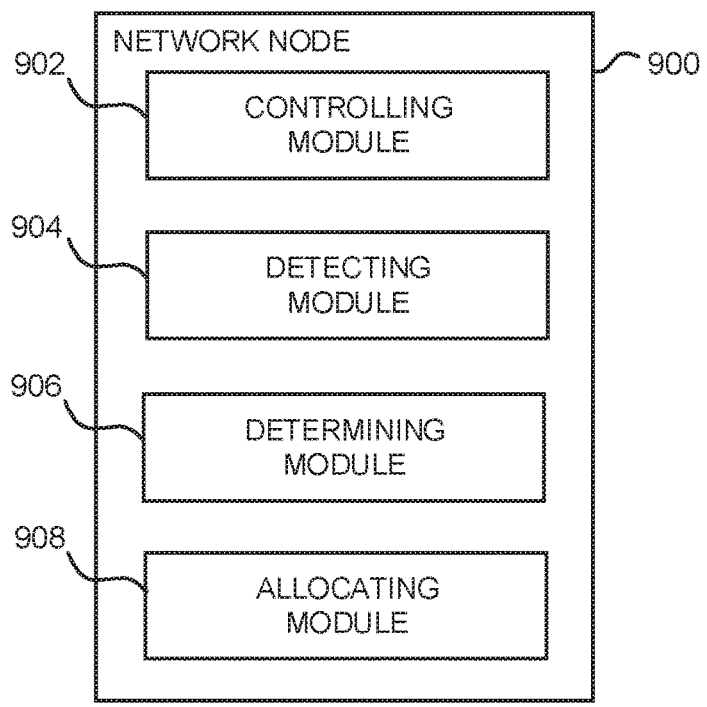

FIG. 9, illustrates schematically a network node 900 that comprises:
- a controlling module 902 configured to control antenna nodes to maintain reception radio lobes substantially along a constrained path such that wireless communication devices can perform uplink radio communication with the network node via reception radio lobes,
- a detecting module 904 configured to detect at east one radio frequency, RF, signal,
- a determining module 906 configured to determine that said detected at least one RF signal originates from a respective wireless communication device of a specific subset among said plurality of wireless communication devices, said specific subset comprising wireless communication devices that are associated with a common radio frequency offset, and
- an allocating module 908 configured to allocate, for all wireless communication devices in said specific subset of wireless communication devices, a common uplink radio communication resource.

The network node 900 may comprise further modules that are configured to perform in a similar manner as, e.g., the network node 800 described above in connection with FIG. 8.

To summarize, various embodiments and examples have been described above. These examples and variations of these examples may be summarized as follows:

1. A network node operating by
   a. determining the frequency offset of a signal received from a UE,
   b. assigning said UE to a group of UEs with substantially the same frequency offset characteristics, and
   c. allocating a radio resource to the UE exclusively used for UEs of said group.
2. Example 1 and where determining a frequency offset of a signal received from a UE involves determining the frequency offset relative to the nominal uplink carrier frequency using at least one of PRACH, PUSCH, PUCCH, UL Reference Signal, and Sounding Reference Signal.
3. Example 1 and where determining a frequency offset of a signal received from a UE involves correlating one or more UE properties such as velocity (speed and direction) with the same properties for other UEs to determine the frequency offset by proxy.
4. Any of Examples 1-3 and where assigning said UE to a group involves comparing the determined frequency offset with characteristic frequency offset for each group, and if close enough, assigning the UE to the closest group; otherwise assigning the UE to a new group.
5. Any of Examples 1-4 and where allocating a radio resource to the UE involves any of: allocating PUCCH resources and allocating PUSCH resources.
6. Example 5 where two UEs with similar frequency offset properties are allocated the same PUSCH resource in multiuser MIMO (MU-MIMO) operation.
7. Example 5 and where multiple UEs with similar frequency offset properties are allocated the same PUCCH resource and hence are overlaid by usage of orthogonal codes and/or sequences with low cross-correlation.
8. Example 5 and where a guard is left between PUSCH and PUCCH, in case the frequency offset difference between the two groups is large, for example exceeding a threshold.
9. Example 5 and where physical PUCCH resources are scheduled to groups of UEs in dependence of frequency offset between the groups to avoid or reduce interference.
10. Any of Examples 1-9 and where the network node monitors whether any UE in a group begins to deviate from the group characteristics, and if such deviation is larger than a threshold, reevaluates to which group the UE shall belong.
11. Any of Examples 1-10 and where assigning and allocating implies sending a RRC Connection Reconfiguration message containing a PUCCH configuration to the UE.
12. Any of Examples 1-11 where the frequency characteristic of the group is used as a priori information when decoding a signal from a UE within said group.
13. Example 12 and where frequency offset is compensated for by digital frequency offset compensation.
14. Example 1 and where the allocation of a radio resource involves selecting a parameter (m) to reconfigure the CQI reporting.
15. Example 14 and where the allocation of a radio resource further involves selecting the parameter cqi-PUCCH-ResourceIndex,
16. Example 14 and where the allocation of a radio resource involves scheduling the PDCCH.

17. Example 1 and where the allocation of a radio resource involves allocating/selecting sequences which are maintained substantially orthogonal by the grouping together of the UEs.

18. Example 17 and where the allocation of a radio resource involves allocating pairs of resource blocks.

The invention claimed is:

1. A method performed by a network node, where the network node is connected to a plurality of antenna nodes that are located along a constrained path where a plurality of wireless communication devices are located, the method comprising:
controlling the antenna nodes to maintain reception radio lobes substantially along the path such that the wireless communication devices can perform uplink radio communication with the network node via the reception radio lobes,
detecting at least one radio frequency, RF, signal,
determining that said detected at least one RF signal originates from a respective wireless communication device of a specific subset among said plurality of wireless communication devices, said specific subset comprising wireless communication devices that are associated with a common radio frequency offset, and
allocating, for all wireless communication devices in said specific subset of wireless communication devices, a common uplink radio communication resource that is configured to simultaneously carry uplink radio communications from all of the wireless communication devices in said specific subset of wireless communication devices.

2. The method of claim 1, wherein said determination that said detected at least one RF signal originates from a respective wireless communication device of a specific subset among said plurality of wireless communication devices comprises:
determining said radio frequency offset relative to a nominal uplink carrier frequency.

3. The method of claim 2, wherein said nominal uplink carrier frequency is associated with at least one of:
a physical random access channel, PRACH,
a physical uplink shared channel, PUSCH,
a physical uplink control channel, PUCCH,
an uplink, UL, reference signal, and
a Sounding Reference Signal, SRS.

4. The method of claim 1, wherein said determination that said detected at least one RF signal originates from a respective wireless communication device of a specific subset among said plurality of wireless communication devices comprises:
determining a velocity of a wireless communication device, and
determining said radio frequency offset based on said determined velocity.

5. The method of claim 4, wherein said determination of a velocity comprises:
obtaining predetermined information available to the network node, said predetermined information comprising information associated with geographic locations of antenna nodes in relation to the path.

6. The method of claim 1, wherein said allocation of a common uplink radio communication resource comprises any of:
allocating a common physical uplink control channel, PUCCH, resource, and
allocating a common physical uplink shared channel, PUSCH, resource.

7. The method of claim 6, wherein any of said PUCCH resource and PUSCH resource comprises at least one pair of resource blocks.

8. The method of claim 6, wherein said allocation of a common PUCCH resource comprises allocating a guard frequency interval between the PUCCH resource and a PUSCH resource.

9. The method of claim 6, wherein said allocation of a common uplink radio communication resource comprises:
selecting an integer number, m, that defines a physical resource to be used, and
transmitting at least one configuration message for channel quality indication, CQI, reporting, said message comprising the integer number m.

10. The method of claim 9, wherein said allocation of a common uplink radio communication resource comprises:
setting a value on a parameter, cqi-PUCCH-ResourceIndex, representing periodicity of reporting and physical resources for use for said reporting of said integer number m, and wherein said transmission of at least one configuration message for CQI reporting further comprises the parameter cqi-PUCCH-ResourceIndex.

11. The method of claim 6, wherein said allocation of a common uplink radio communication resource comprises:
performing scheduling of a physical downlink control channel, PDCCH.

12. The method of claim 1, wherein:
a first subset of wireless communication devices is associated with a first common radio frequency offset,
a second subset of wireless communication devices is associated with a second common radio frequency offset, and the method comprising:
determining a difference between said first and second common radio frequency offset, and
allocating, in dependence on the determination of said difference, for all wireless communication devices in the first and second subset of wireless communication devices, a respective first and second common uplink radio communication resource.

13. The method of claim 1, wherein said allocation of a common uplink radio communication resource comprises:
transmitting a radio resource control, RRC, connection reconfiguration message that comprises configuration information for said uplink radio communication resource.

14. The method of claim 13, wherein said common uplink radio communication resource is a PUCCH and said information for said uplink radio communication resource comprises a PUCCH configuration.

15. A network node configured to be connected to a plurality of antenna nodes that are located along a constrained path where a plurality of wireless communication devices are located, the network node comprising input/output circuitry, a processor and a memory, said memory containing instructions executable by said processor whereby said network node is operative to:
control the antenna nodes to maintain reception radio lobes substantially along the path such that the wireless communication devices can perform uplink radio communication with the network node via the reception radio lobes,
detect at least one radio frequency, RF, signal,
determine that said detected at least one RF signal originates from a respective wireless communication device of a specific subset among said plurality of wireless communication devices, said specific subset comprising wireless communication devices that are associated with a common radio frequency offset, and allocate, for all wireless communication devices in said specific subset of wireless communication devices, a common uplink radio communication resource that is configured to simultaneously carry uplink radio communications from all of the wireless communication devices in said specific subset of wireless communication devices.

16. The network node of claim 15, operative such that said determination that said detected at least one RF signal originates from a respective wireless communication device of a specific subset among said plurality of wireless communication devices comprises:

determining said radio frequency offset relative to a nominal uplink carrier frequency.

17. The network node of claim 16, operative such that said nominal uplink carrier frequency is associated with at least one of:

a physical random access channel, PRACH,
a physical uplink shared channel, PUSCH,
a physical uplink control channel, PUCCH,
an uplink, UL, reference signal, and
a Sounding Reference Signal, SRS.

18. The network node of claim 15, operative such that said determination that said detected at least one RF signal originates from a respective wireless communication device of a specific subset among said plurality of wireless communication devices comprises:

determining a velocity of a wireless communication device, and determining said radio frequency offset based on said determined velocity.

19. The network node of claim 18, operative such that said determination of a velocity comprises:

obtaining predetermined information available to the network node, said predetermined information comprising information associated with geographic locations of antenna nodes in relation to the path.

20. The network node of claim 15, operative such that said allocation of a common uplink radio communication resource comprises any of:

allocating a common physical uplink control channel, PUCCH, resource, and allocating a common physical uplink shared channel, PUSCH, resource.

21. The network node of claim 20, operative such that any of said PUCCH resource and PUSCH resource comprises at least one pair of resource blocks.

22. The network node of claim 20, operative such that said allocation of a common PUCCH resource comprises allocating a guard frequency interval between the PUCCH resource and a PUSCH resource.

23. The network node of claim 20, operative such that said allocation of a common uplink radio communication resource comprises:

selecting an integer number, m, that defines a physical resource to be used, and transmitting at least one configuration message for channel quality indication, CQI, reporting, said message comprising the integer number m.

24. The network node of claim 23, operative such that said allocation of a common uplink radio communication resource comprises:

setting a value on a parameter, cqi-PUCCH-ResourceIndex, representing periodicity of reporting and physical resources for use for said reporting of said integer number m, and wherein said transmission of at least one configuration message for CQI reporting further comprises the parameter cqi-PUCCH-ResourceIndex.

25. The network node of claim 20, operative such that said allocation of a common uplink radio communication resource comprises:

performing scheduling of a physical downlink control channel, PDCCH.

26. The network node of claim 15, operative such that:

a first subset of wireless communication devices is associated with a first common radio frequency offset, a second subset of wireless communication devices is associated with a second common radio frequency offset, and the operative to:

determine a difference between said first and second common radio frequency offset, and allocate, in dependence on the determination of said difference, for all wireless communication devices in the first and second subset of wireless communication devices, a respective first and second common uplink radio communication resource.

27. The network node of claim 15, operative such that said allocation of a common uplink radio communication resource comprises:

transmitting a radio resource control, RRC, connection reconfiguration message that comprises configuration information for said uplink radio communication resource.

28. The network node of claim 27, operative such that said common uplink radio communication resource is a PUCCH and said information for said uplink radio communication resource comprises a PUCCH configuration.

29. A nontransitory computer readable storage medium comprising a computer program comprising instructions which, when executed on at least one processor in a network node, cause the network node to carry out a method, wherein the network node is connected to a plurality of antenna nodes that are located along a constrained path where a plurality of wireless communication devices are located, and wherein the method comprises:

controlling the antenna nodes to maintain reception radio lobes substantially along the path such that the wireless communication devices can perform uplink radio communication with the network node via the reception radio lobes, detecting at least one radio frequency, RF, signal, determining that said detected at least one RF signal originates from a respective wireless communication device of a specific subset among said plurality of wireless communication devices, said specific subset comprising wireless communication devices that are associated with a common radio frequency offset, and allocating, for all wireless communication devices in said specific subset of wireless communication devices, a common uplink radio communication resource that is configured to simultaneously carry uplink radio communications from all of the wireless communication devices in said specific subset of wireless communication devices.

* * * * *